US009603036B2

(12) United States Patent
Ljung

(10) Patent No.: US 9,603,036 B2
(45) Date of Patent: *Mar. 21, 2017

(54) DYNAMIC ADAPTATION OF COMMUNICATION PARAMETERS FOR COMMUNICATION BETWEEN A BASE STATION AND A TERMINAL IN A WIRELESS COMMUNICATION NETWORK

(71) Applicant: Sony Mobile Communications AB, Lund (SE)

(72) Inventor: Rickard Ljung, Helsingborg (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 62 days.

This patent is subject to a terminal disclaimer.

(21) Appl. No.: 14/456,257

(22) Filed: Aug. 11, 2014

(65) Prior Publication Data
US 2015/0024767 A1 Jan. 22, 2015

Related U.S. Application Data

(63) Continuation of application No. 13/559,816, filed on Jul. 27, 2012, now Pat. No. 8,805,393.

(51) Int. Cl.
*H04W 12/00* (2009.01)
*H04W 24/02* (2009.01)
*H04W 76/02* (2009.01)

(52) U.S. Cl.
CPC ........... *H04W 24/02* (2013.01); *H04W 76/02* (2013.01); *H04W 76/021* (2013.01); *H04W 12/00* (2013.01)

(58) Field of Classification Search
CPC ..... H04W 12/00; H04W 24/02; H04W 76/02; H04W 76/021

(Continued)

(56) References Cited

U.S. PATENT DOCUMENTS 6,141,565 A 10/2000 Feuerstein et al.
6,865,163 B1 3/2005 Bergenwall et al.
(Continued)

FOREIGN PATENT DOCUMENTS

WO 2011134099 11/2011

OTHER PUBLICATIONS

International Preliminary Report on Patentability dated Feb. 5, 2014 for corresponding International Application No. PCT/IB2013/001638 filed Jul. 26, 2013.

(Continued)

*Primary Examiner* — Jean Gelin
(74) *Attorney, Agent, or Firm* — Renner, Otto, Boisselle & Sklar, LLP.

(57) ABSTRACT

A system for dynamic adaptation of communication parameters for communication between a base station and terminals in a wireless telecommunications network includes one or more transmitters configured for transmission of signals in the network using a broadcast channel between the base station and the terminals, a machine-readable storage medium having stored therein data associated with communication parameters of the wireless telecommunications network, and a base station controller operatively connected to the one or more transmitters and the machine-readable storage medium and configured to cause the one or more transmitters to transmit adaptation signals from the base station to the terminals using the broadcast channel between the base station and the terminals, wherein the data is configured to cause the terminals to adapt the communication parameters and to begin network search and attach procedures for communication with the base station utilizing the adapted communication parameters.

20 Claims, 6 Drawing Sheets

(58) Field of Classification Search
USPC ... 455/450, 452.1, 452.2, 453, 512, 513, 62;
370/252, 276, 277, 278, 335, 337, 341,
370/329, 331
See application file for complete search history.

(56) References Cited

U.S. PATENT DOCUMENTS

| | | | |
|---|---|---|---|
| 7,734,262 B2 | 6/2010 | Akbar Attar et al. | |
| 7,978,673 B1 | 7/2011 | Uhlik et al. | |
| 8,325,624 B2 | 12/2012 | Hammarwall et al. | |
| 8,432,817 B2 | 4/2013 | Majidi-Ahy et al. | |
| 2003/0232621 A1* | 12/2003 | Brooks | H04W 28/22 |
| | | | 455/424 |
| 2004/0053630 A1 | 3/2004 | Ramos et al. | |
| 2006/0098582 A1 | 5/2006 | Varma et al. | |
| 2007/0070180 A1* | 3/2007 | Rooven | H04H 20/24 |
| | | | 348/14.02 |
| 2008/0046132 A1 | 2/2008 | Dalsgaard et al. | |
| 2008/0130570 A1 | 6/2008 | Jung et al. | |
| 2009/0161616 A1* | 6/2009 | Ramesh | H04L 5/0053 |
| | | | 370/329 |
| 2009/0298528 A1 | 12/2009 | Cave et al. | |
| 2009/0310511 A1 | 12/2009 | Vaswani et al. | |
| 2009/0311963 A1* | 12/2009 | Haverty | H04K 3/226 |
| | | | 455/63.1 |
| 2010/0182955 A1 | 7/2010 | Bjork et al. | |
| 2010/0216467 A1 | 8/2010 | Ryan et al. | |
| 2010/0284454 A1 | 11/2010 | Oteri et al. | |
| 2010/0285828 A1 | 11/2010 | Panian et al. | |
| 2012/0014308 A1 | 1/2012 | Li et al. | |
| 2012/0071085 A1 | 3/2012 | Gunnarsson et al. | |
| 2013/0003541 A1 | 1/2013 | Zakrzewski | |
| 2013/0003599 A1 | 1/2013 | Zakrzewski | |
| 2013/0064122 A1 | 3/2013 | Hammarwall et al. | |
| 2013/0208587 A1 | 8/2013 | Bala et al. | |
| 2013/0281089 A1* | 10/2013 | Chandrasekhar | H04W 24/02 |
| | | | 455/434 |

OTHER PUBLICATIONS

International Search Report and Written Opinion dated Jan. 26, 2014 for corresponding International Application No. PCT/IB2013/001638 filed Jul. 26, 2013.

"3$^{rd}$ Generation Partnership Project; Technical Specification Group Services and System Aspects; Telecommunication management; Self-configuration of network elements; Concepts and requirements (Release 10)", 3GPP TS 32.501 V10.0.0 (Mar. 2011).

* cited by examiner

DYNAMIC ADAPTATION OF COMMUNICATION PARAMETERS FOR COMMUNICATION BETWEEN A BASE STATION AND A TERMINAL IN A WIRELESS COMMUNICATION NETWORK

TECHNICAL FIELD OF THE INVENTION

The technology of the present disclosure relates generally to portable electronic devices and transmission equipment operable in a wireless communication network, and more particularly to systems and methods for dynamic adaptation of communication parameters for communication between base stations and terminals in a wireless communication network.

DESCRIPTION OF THE RELATED ART

Portable electronic devices that operate on a cellular network, such as mobile telephones and smartphones, tablet computers, cellular-connected laptop computers, and similar devices are ever increasing in popularity. Cellular telecommunications networks utilize various different systems including Global System for Mobile Communications (GSM), Universal Mobile Telecommunications System (UMTS), and Long Term Evolution (LTE) systems among others that operate in various different frequency bands. The utilization of these mobile telecommunication systems changes over time. Consumers and their terminals are moving and are over time accessing different cells in the telecommunication network that may support different systems or technologies. In addition the technologies supported by the terminals themselves vary over time since new terminals entering the market support ever increasing feature sets such as additional radio access technologies and additional frequency bands.

For an operator, this load and technology variation makes the cell planning challenging. New base stations can be added to the network and existing base stations can be upgraded to support new radio access technologies, but such changes often must be done manually by means of adding additional hardware into the network. Hence, the process of planning and upgrading the network is both time-consuming and expensive. Moreover, modifications to the network parameters are also static in the sense that, once a base station is activated to use a certain radio access technology at a certain frequency band, this is typically not changed for many months or even years.

SUMMARY

The concept of the systems and methods disclosed herein include the capability for the network to dynamically adopt each base station's radio access technology and/or usage of total spectrum to current needs. Through signaling, base stations can cause changes in telecommunications network parameters such as a changes of frequency for a cell and/or a change of radio access technology.

The concept of the systems and methods disclosed herein may be implemented as an addition to the existing concept of Self Optimized Network (SON), which concept is specified in TS 32.501 and TS 36.902 of the 3GPP specification. SON together with Automatic Neighbor Reporting (ANR) are concepts introduced in the 3GPP specification for LTE, but also transferred into the WCDMA standard, that allow for networks to get information about how terminals experience the system, for example, in terms of existing network coverage. SON provides a base station with the ability to request radio access related quality measurements from one or many connected terminals. Within SON, networks can request terminals to report what neighbor base stations the terminals can find, or other network parameters.

This information can then be utilized for adapting base station parameters such as pilot signal strength in order to modify the coverage and control signaling for a certain cell, for example, in the case where a new base station is installed into the network. Also the operator can get information about issues with the current network coverage. Through SON, the network may keep a report that includes neighboring cell information. When a base station is informed about cell neighbor changes it can update its neighbor lists used, for example, for handover signaling. The base station can also exchange the SON information with other cells. Hence by means of SON the operator does not have to manually adjust pilot signals and neighbor lists when, for example, introducing additional base stations into the network.

The concept of the systems and methods disclosed herein may be implemented as an addition to the existing concept of SON to include the capability for the network to dynamically adopt each base station's radio access technology and/or usage of total spectrum to current needs. The concept is denoted herein as enhanced-SON or eSON signaling. The eSON signaling can signal changes in telecommunications network parameters such as a change of frequency for a cell and/or a change of radio access technology.

Accordingly, in one aspect of the invention a method for dynamic adaptation of one or more communication parameters for communication between a base station and a terminal in a wireless telecommunications network includes participating in the communication of an adaptation signal from the base station to the terminal using a broadcast channel between the base station and the terminal. The adaptation signal includes data associated with a first communication parameter to be adapted and that is configured to cause the terminal to adapt the first communication parameter and to begin network search and attach procedures for communication with the base station utilizing the adapted first communication parameter. The method for dynamic adaptation of one or more communication parameters also includes communicating between the base station and the terminal utilizing the adapted first communication parameter.

In one embodiment, the first communication parameter corresponds to a parameter specifying a radio access technology (RAT) for communication between the base station and the terminal, and the adaptation signal includes data configured to cause the terminal to adapt the first communication parameter to specify an upcoming RAT and to begin network search and attach procedures for communication with the base station utilizing the upcoming RAT.

In another embodiment, the method includes activating self-optimizing network (SON) capability for the base station operating utilizing the upcoming RAT to cause neighboring cells in the network to recognize that the base station is operating utilizing the upcoming RAT.

In yet another embodiment, the dynamic adaptation takes place from a previous RAT to the upcoming RAT, and the participating in the communication of the adaptation signal includes participating in the communication of one or more adaptation signals including data associated with a second communication parameter corresponding to a parameter specifying a frequency band for communication between the base station and the terminal utilizing the upcoming RAT and that is configured to cause the terminal to adapt the second communication parameter to specify an upcoming frequency band for communication with the base station in the upcoming RAT and to begin network search and attach procedures for communication with the base station utilizing the upcoming frequency band and the upcoming RAT.

In one embodiment, the base station is capable of communicating utilizing the previous RAT and the upcoming RAT, and the method includes gradually increasing an amount of frequency band allocated to the upcoming RAT in the network; and gradually decreasing an amount of band allocated to the previous RAT in the network.

In another embodiment, the first communication parameter corresponds to a parameter specifying a frequency band for communication between the base station and the terminal, and the adaptation signal includes data configured to cause the terminal to adapt the first communication parameter to specify an upcoming frequency band and to begin network search and attach procedures for communication with the base station utilizing the upcoming frequency band.

In yet another embodiment, the method includes activating self-optimizing network (SON) capability for the base station operating utilizing the upcoming frequency band to cause neighboring cells in the network to recognize that the base station is operating utilizing the upcoming frequency band.

In one embodiment, the transmitting the adaptation signal from the base station to the terminal is initiated by a radio resource scheduling software associated with the base station.

According to another aspect of the invention a system for dynamic adaptation of one or more communication parameters for communication between a base station and a terminal in a wireless telecommunications network includes one or more transmitters configured for transmission of signals in the network using a broadcast channel between the base station and the terminal, a machine-readable storage medium having stored therein data associated with a first communication parameter of the wireless telecommunications network, and a base station controller operatively connected to the one or more transmitters and the machine-readable storage medium and configured to cause the one or more transmitters to transmit an adaptation signal from the base station to the terminal using the broadcast channel between the base station and the terminal. The data is configured to cause the terminal to adapt the first communication parameter and to begin network search and attach procedures for communication with the base station utilizing the adapted first communication parameter.

In one embodiment, the first communication parameter corresponds to a parameter specifying a radio access technology (RAT) for communication between the base station and the terminal, and the adaptation signal includes data configured to cause the terminal to adapt the first communication parameter to specify an upcoming RAT and to begin network search and attach procedures for communication with the base station utilizing the upcoming RAT.

In another embodiment, the base station controller is further configured to activate self-optimizing network (SON) capability for the base station operating utilizing the upcoming RAT to perform at least one of: causing neighboring cells in the network to recognize that the base station is operating utilizing the upcoming RAT, setting appropriate pilot strength, and updating a neighbor list corresponding to neighbor base stations of the base station.

In yet another embodiment, the dynamic adaptation takes place from a previous RAT to the upcoming RAT, the base station controller is configured to cause the one or more transmitters to transmit one or more adaptation signals including data associated with a second communication parameter corresponding to a parameter specifying a frequency band for communication between the base station and the terminal utilizing the upcoming RAT, and the data associated with the second communication parameter is configured to cause the terminal to adapt the second communication parameter to specify an upcoming frequency band for communication with the base station in the upcoming RAT and to begin network search and attach procedures for communication with the base station utilizing the upcoming frequency band and the upcoming RAT.

In one embodiment, the one or more transmitters includes a first transmitter configured to communicate in the network utilizing the previous RAT, and a second transmitter configured to communicate in the network utilizing the upcoming RAT, and the base station controller is configured to gradually increase an amount of frequency band allocated to the upcoming RAT in the network, and to gradually decrease an amount of band allocated to the previous RAT in the network.

In another embodiment, the first communication parameter corresponds to a parameter specifying a frequency band for communication between the base station and the terminal, and the adaptation signal includes data configured to cause the terminal to adapt the first communication parameter to specify an upcoming frequency band and to begin network search and attach procedures for communication with the base station utilizing the upcoming frequency band.

In yet another embodiment, the base station controller is further configured to activate self-optimizing network (SON) capability for the base station operating utilizing the upcoming frequency band to cause neighboring cells in the network to recognize that the base station is operating utilizing the upcoming frequency band.

In one embodiment, the system includes a radio resource scheduling logic configured to work in conjunction with the base station controller to cause the one or more transmitters to transmit the adaptation signal from the base station to the terminal.

In yet another aspect of the invention an apparatus for dynamic adaptation of one or more communication parameters for communication between a base station and a terminal in a wireless telecommunications network includes one or more receivers configured for receiving of signals in the network using a broadcast channel between the base station and the terminal, a machine-readable storage medium having stored therein data associated with a first communication parameter of the wireless telecommunications network, and a terminal controller operatively connected to the one or more receivers and the machine-readable storage medium and configured to, upon the one or more receivers receiving from the base station an adaptation signal including data configured to cause the terminal to adapt the first communication parameter, begin network search and attach procedures for communication with the base station utilizing the adapted first communication parameter.

In one embodiment, the first communication parameter corresponds to a parameter specifying a radio access technology (RAT) for communication between the base station and the terminal, the adaptation signal includes data configured to cause the terminal to adapt the first communication parameter to specify an upcoming RAT, and the terminal controller is configured to begin network search and attach procedures for communication with the base station utilizing the upcoming RAT.

In another embodiment, the one or more receivers are configured to receive one or more adaptation signals including data associated with a second communication parameter corresponding to a parameter specifying a frequency band for communication between the base station and the terminal utilizing the upcoming RAT, and the data associated with the second communication parameter is configured to cause the terminal to adapt the second communication parameter to specify an upcoming frequency band for communication with the base station in the upcoming RAT and to begin network search and attach procedures for communication with the base station utilizing the upcoming frequency band and the upcoming RAT.

In yet another embodiment, the first communication parameter corresponds to a parameter specifying a frequency band for communication between the base station and the terminal, and the adaptation signal includes data configured to cause the terminal to adapt the first communication parameter to specify an upcoming frequency band and to begin network search and attach procedures for communication with the base station utilizing the upcoming frequency band.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1A:
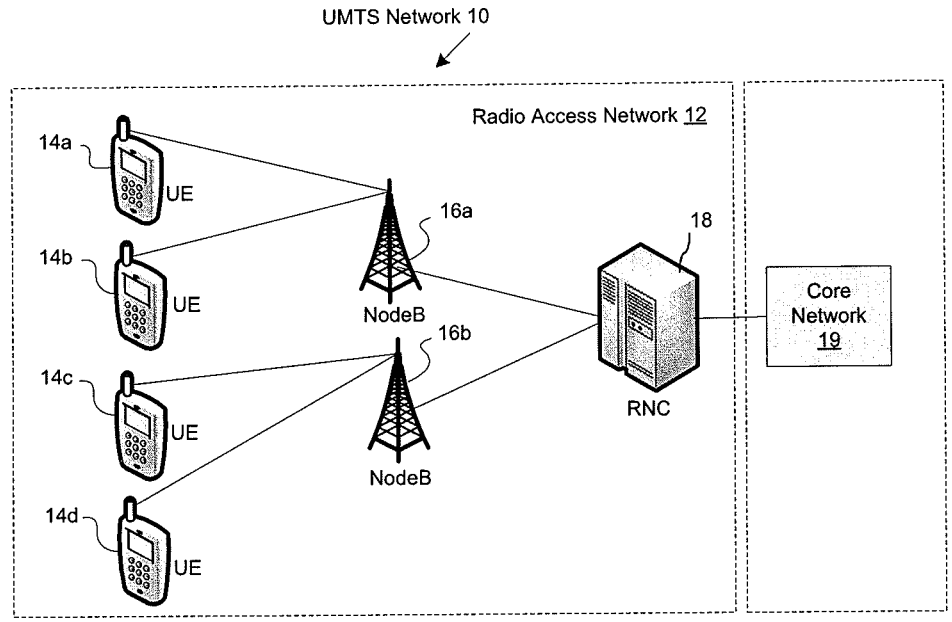
FIG. 1A illustrates a portion of a Universal Mobile Telecommunications System (UMTS) wireless telecommunications network.

As described in more detail below, the present disclosure provides systems and methods that provide telecommunications networks with the capability for the networks to dynamically adopt each base station's radio access technology and/or usage of total spectrum to current needs.

Embodiments of the present invention will now be described with reference to the drawings, wherein like reference numerals are used to refer to like elements throughout. It will be understood that the figures are not necessarily to scale.

Figure 1B:
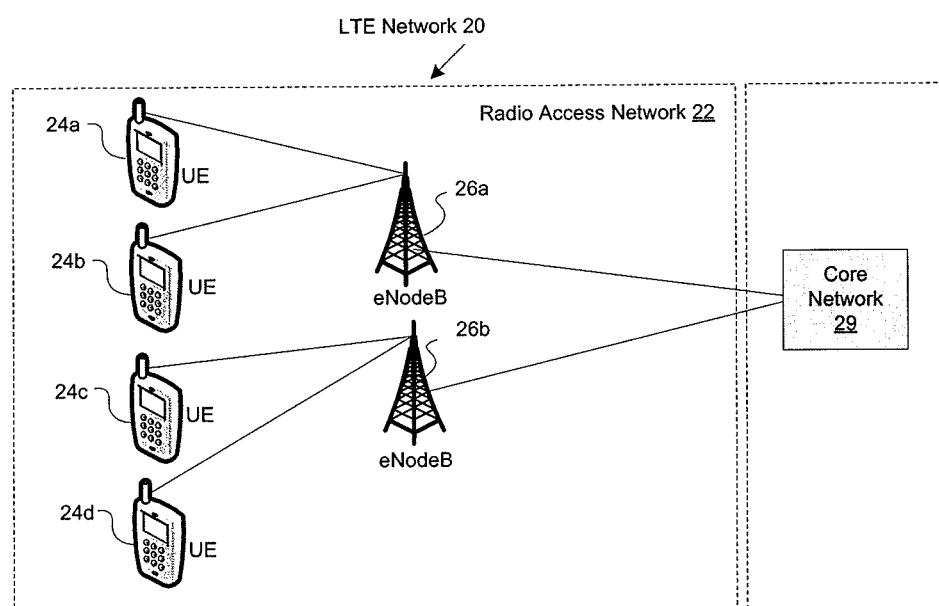
FIG. 1B illustrates a portion of a Long Term Evolution (LTE) network.

FIGS. 1A and 1B illustrate portions of a Universal Mobile Telecommunications System (UMTS) wireless telecommunications network 10 and a Long Term Evolution (LTE). The UMTS network 10 and the LTE each includes a radio access network (RAN) 12 and 22, respectively. In UMTS the RAN 12 is referred to as a Universal Terrestrial Radio Access Network (UTRAN) while in LTE the access network 22 is referred to as an Evolved Universal Terrestrial Radio Access Network (EUTRAN). The RAN 12 and 22 include terminals 14a-d and 24a-d, respectively. The terminals 14a-d are what in UMTS parlance is referred to as mobile stations (MS) or user equipment (UE), while the terminals 24a-d are what in LTE is referred to as user equipment (UE). In wireless telecommunications networks other than UMTS and LTE, including networks that are currently deployed as well as networks that are currently in development or that will be developed in the future, the terminals may be referred to by terms other than terminals, mobile stations, or user equipment. However, the term terminals as employed herein is intended to include those terminals in wireless telecommunications networks such as UMTS and LTE as well as networks other than UMTS and LTE, and terminals in yet to be developed or deployed networks where the terminals have similar functionality as the terminals described herein in the context of UMTS and LTE.

The RAN 12 and 22 further include base stations 16a-b and 26a-b. In UMTS the base stations 16a-b are known as NodeB (NB) and in LTE the base stations 26a-b are known as eNodeB (evolved NodeB or eNB). In wireless telecommunications networks other than UMTS and LTE, including networks that are currently deployed as well as networks that are currently in development or that will be developed in the future, the base stations may be referred to by terms other than base stations, NodeB, or eNodeB. However, the term base station as employed herein is intended to include those base stations in wireless telecommunications networks such as UMTS and LTE as well as networks other than UMTS and LTE, and base stations in yet to be developed or deployed networks where the base stations have similar functionality as the base stations described herein in the context of UMTS and LTE.

The RAN 12 further includes a radio network controller (RNC) 18, which is responsible for controlling the base stations 16a-b. In some systems, the NodeB has minimum control functionality and are mostly controlled by the RNC. However, in other systems, for example those utilizing High Speed Packet Access (HSPA), at least some of the control functionality is handled by the Node B. In LTE most of the functionality of the RNC 18 is built into the eNodeB base stations 26a-b and thus the LTE does not include an equivalent to the RNC 18. The UMTS network 10 and the LTE include core networks 19 and 29, respectively, which are the parts of the telecommunications network that provide the various services to customers who are connected by the RAN 12 and 22.

The base stations 16a-b of the UMTS network 10 communicate with the terminals 14a-d using radio access technologies (RAT) including Wideband Code Division Multiple Access (WCDMA) via an air interface known as the Uu interface or UMTS air interface. The RAT used in LTE is known as LTE and the air interface is known as LTE-Uu.

Although networks 10 and 20 have been described as discreetly UMTS and LTE, respectively, in practice, base stations may be multi radio units, capable of transmitting in several different RAT. Moreover, different cells in the same base station may often use more than one frequency band. Due to the reuse of infrastructure at the cellular sites, as well as backhaul capabilities, a single base station may be using more than one RAT and may be transmitting at more than one carrier frequency.

Often, the network operator has flexibility in the use of RAT and frequency spectrum. The network operator may have license to utilize more than one RAT and to transmit at more than one frequency band, and/or the license may also be RAT independent, meaning that the operator is not forced to utilize a certain RAT on the licensed spectrum as long as it fulfills certain criteria (e.g. out of band spectrum emission).

Figure 2:
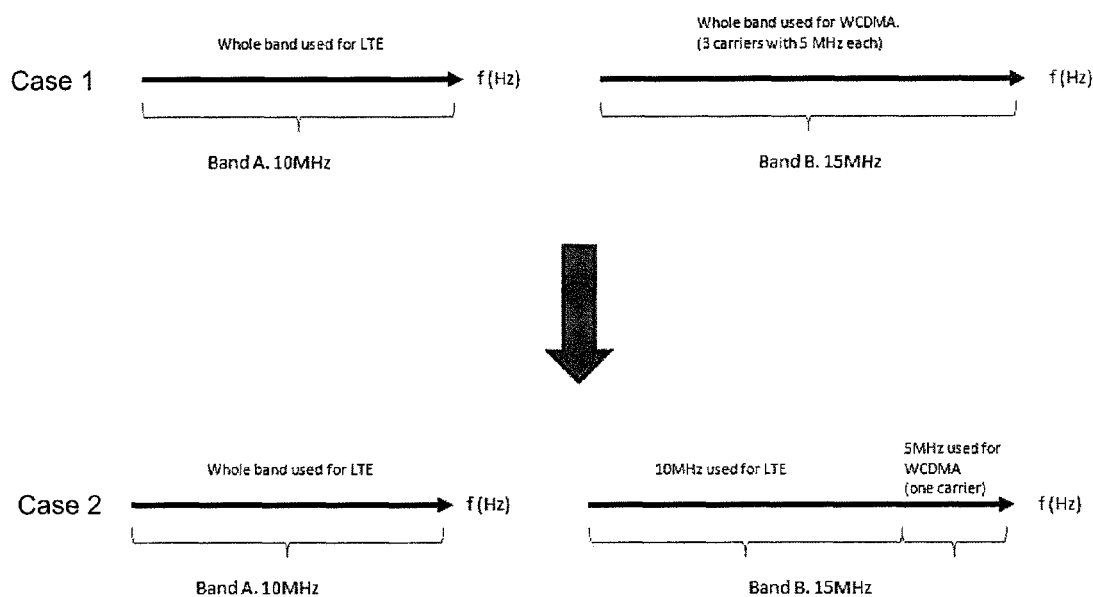
FIG. 2 shows a graphical illustration of an example of dynamic RAT and spectrum utilization where an operator has both WCDMA and LTE networks rolled out in the same country or region.

FIG. 2 shows a graphical illustration of an example of dynamic RAT and spectrum utilization where an operator has both WCDMA and LTE networks rolled out in the same country or region. Typically, WCDMA needs one or more multiples of 5 MHz bandwidth to operate. LTE is more flexible and can utilize 1.4 MHz as the lowest bandwidth, but also 5 MHz or larger bandwidths. If we assume that the operator has an allocated bandwidth of at least 5 MHz in each of two bands, Band A and Band B, it would be possible to run any of the RAT, WCDMA and LTE, in any of the two frequency bands. If the allocated bandwidth in each of the two bands is more than 6.4 MHz, the technologies could coexist on both frequency bands.

In Case 1, which may be typical of networks operating without the systems and methods disclosed herein, each of the networks, WCDMA and LTE, utilizes its own separate frequency band. LTE utilizes Band A with a 10 MHz bandwidth while three WCDMA carriers of 5 MHz each utilize the whole 15 MHz of Band B.

In a system employing dynamic adaptation of RAT and/or frequency bands, Case 2 is possible. In Case 2 LTE utilizes Band A with a 10 MHz bandwidth and a 10 MHz portion of Band B, while WCDMA utilizes the remaining 5 MHz bandwidth of Band B. Thus, in a system employing dynamic adaptation of RAT and/or frequency bands where RAT and frequency band may be changed dynamically over time, the network operator has the flexibility to dynamically customize RAT and/or frequency bands to satisfy current network needs. Note that FIG. 2 illustrates spectrum usage in one cell for one operator only. In one frequency band other operators may also have licenses and their usage of other part of frequency bands is not discussed in this example.

Figure 3:
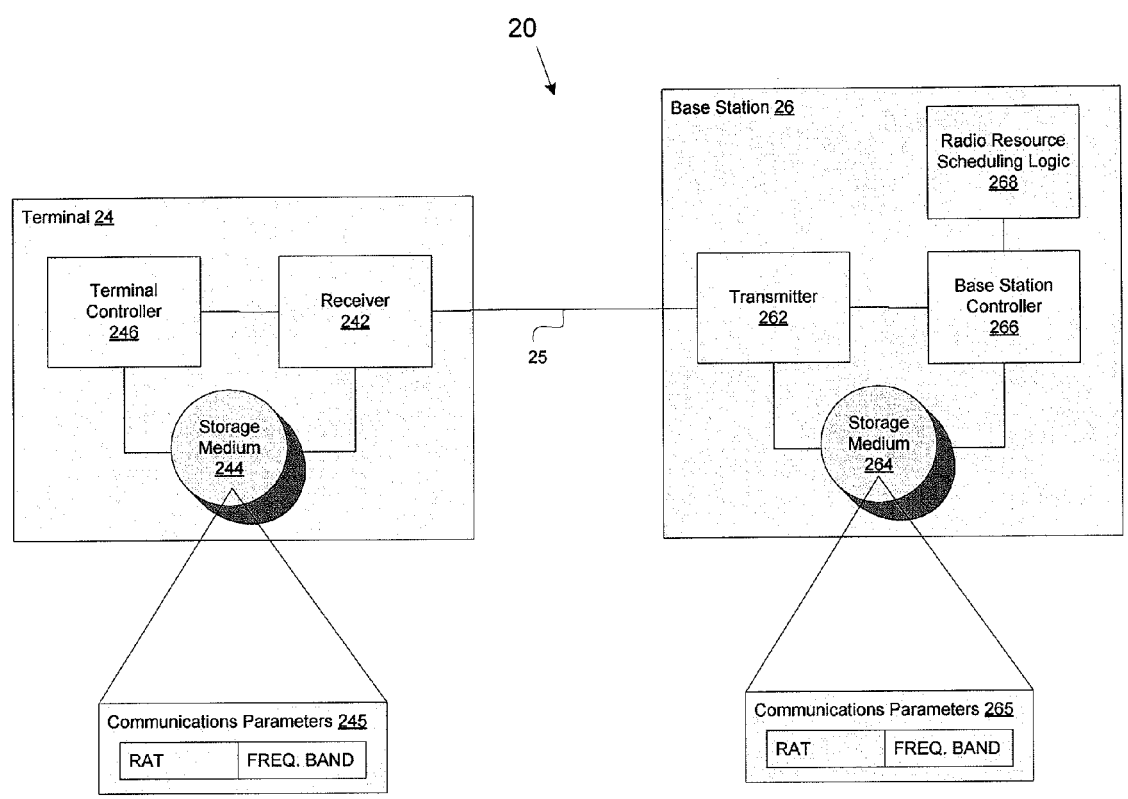
FIG. 3 illustrates a schematic diagram of a system for dynamic adaptation of one or more communication parameters for communication between a base station and a terminal in a wireless telecommunications network.

FIG. 3 illustrates a schematic diagram of a system for dynamic adaptation of one or more communication parameters for communication between a base station 26 and a terminal 24 in a wireless telecommunications network 20.

The base station 26 includes a transmitter 262 that transmits signals in the network 20 using a broadcast channel 25 between the base station 26 and the terminal 24. In one embodiment, the broadcast channel 25 is the Physical Broadcast Channel (PBCH) as defined in the 3GPP specification. In another embodiment, the broadcast channel 25 is any one of physical, transport or logical channels as specified in the 3GPP specification. In yet another embodiment, the broadcast channel 25 is any a physical, transport or logical channel not currently specified in the 3GPP specification. In one embodiment, the base station 26 includes more than one transmitter. For example, a first transmitter may transmit utilizing a first RAT, while a second transmitter in the same base station may transmit utilizing a different RAT. Similarly, a first transmitter may transmit utilizing a RAT in a first frequency band, while a second transmitter in the same base station may transmit utilizing the same RAT, but in a different frequency band, and so on.

The base station 26 further includes a machine-readable storage medium 264 that has stored therein data associated with communication parameters 265 of the wireless telecommunications network 20. In the illustrated embodiment, the communications parameters 265 include radio access technology (RAT) and frequency band (FREQ. BAND) in which the base station 26 can operate. In another embodiment, the communications parameters include parameters other than or in addition to RAT and frequency band.

The base station 26 further includes a base station controller 266 that connects to the transmitter 262 and the machine-readable storage medium 264. The base station controller 266 controls the transmitter 262 to transmit an adaptation signal from the base station 26 to the terminal 24 using the broadcast channel 25.

The terminal 24 includes a receiver 242 that receives signals, including the adaptation signal, using the broadcast channel 25 between the base station 26 and the terminal 24. In one embodiment, the terminal 24 includes more than one receiver. The terminal further includes a machine-readable storage medium 244 that stores data associated with communication parameters 245 of the terminal 24. The communications parameters 245 of the terminal 24 include radio access technology (RAT) and frequency band (FREQ. BAND) in which the terminal 24 currently operates.

The adaptation signal transmitted by the base station 26 and received by the terminal 24 includes data configured to cause the terminal 24 to adapt the communication parameters 245 and to begin network search and attach procedures for communication with the base station 26 utilizing the adapted communication parameters 245. The communications parameters 245 may be adapted to add, remove, or change a RAT in which the terminal 24 communicates with the base station 26. Similarly, the communications parameters 245 may be adapted to modify a frequency band in which the terminal 24 communicates with the base station 26. In another embodiment, the communications parameters include parameters other than RAT and frequency band.

The terminal 24 further includes a terminal controller 246 connected to the receiver 242 and the machine-readable storage medium 244. The terminal controller 246 controls the terminal 24 so that, upon the receiver 242 receiving from the base station 26 the adaptation signal, the terminal 24 begins network search and attach procedures for communication with the base station 26 utilizing the adapted communication parameters 245.

Therefore, the base station 26 can signal an upcoming RAT and/or frequency change information for a certain cell using the broadcast channel 25. Terminals, such as terminal 24 that are connected to that specific cell at that time and that support the described eSON capability will understand the command signaled and start network search/attach procedures for a new or adapted if the terminal has support for the new frequency and/or radio access technology.

Two types of terminals may not be capable of accepting or reacting to the adaptation signal and thus may not be directly switched over to a frequency band and/or RAT by means of the eSON signaling: 1) terminals connected to the cell, but that do not have support for the upcoming RAT, and 2) terminals without eSON support, which cannot read the adaptation signal and therefore will not understand the eSON command. For these types of terminals explicit inter-RAT or inter-frequency handovers to other cells may be required prior to the eSON operation.

After the eSON operation, legacy SON functionality may be activated in order for the new cell utilizing the updated communications parameters to be recognized by neighbor cells. In one embodiment, after terminals such as the terminal 24 have been signaled to adapt the communications parameters 245 corresponding to the upcoming RAT and begin network search and attach procedures for communication with the base station 26 utilizing the adapted RAT communication parameters, the base station controller 266 activates SON capability for the base station 26 operating utilizing the upcoming RAT to cause neighboring cells in the network to recognize that the base station 26 operates a cell utilizing the upcoming RAT. In another embodiment, after terminals such as the terminal 24 have been signaled to adapt the communications parameters 245 corresponding to a new frequency band and begin network search and attach procedures for communication with the base station 26 utilizing the adapted frequency band communication parameters, the base station controller 266 activates SON capability for the base station 26 operating utilizing the new frequency band to cause neighboring cells in the network to recognize that the base station 26 operates a cell utilizing the new frequency band. Legacy SON functionality may also be activated in order for appropriate pilot strength of the new cell to be set and for the new cell to update its own neighbor lists.

As discussed above in reference to FIG. 2, in a system employing dynamic adaptation of RAT and/or frequency bands as described herein where RAT and frequency band may be changed dynamically over time, the network operator has the flexibility to dynamically customize RAT and/or frequency bands to satisfy current network needs.

Back to FIG. 3, in one embodiment, the base station controller 266 causes the transmitter 262 to transmit adaptation signals including data associated with a specific RAT and with a specific frequency band for communication between the base station 26 and the terminal 24 utilizing the specified RAT in the specified frequency band. The receiver 242 receives the adaptation signals, and the data associated with the specific RAT and with the specific frequency band causes the adaptation of the communications parameters 245, specifically the RAT and FREQ. BAND parameters. The terminal controller 246 begins network search and attach procedures for communication with the base station 26 utilizing the specified RAT in the specified frequency band.

In one embodiment, the base station controller 266 causes the transmitter 262 to transmit adaption signals to gradually increase a frequency bandwidth allocated to an upcoming RAT in the network while gradually decreasing a frequency bandwidth allocated to a previous RAT in the network. This way, as an older RAT is being phased out from the network and a new RAT is being deployed, the phasing out and deployment may be performed gradually. In one embodiment, the gradual phasing out and implementation of RAT is based on measurements taken in the network regarding base station or cell utilization and the capabilities of terminals connected to the base station or cell. For example, as a terminal fleet is evolving over time, the network can dynamically adjust its utilization of different RAT and frequency spectrum to offer optimized total system capacity.

In another embodiment, small cell deployments (e.g., femtocells, picocells, home-deployed eNodeB) dynamically switch their frequency spectrum allocation and/or radio access technology depending on the properties of terminals currently in the proximity of the small cell. Since a small cell is typically deployed to handle capacity peaks by means of offloading the macro network, optimizing the utilization of specific RAT and/or frequency spectrum allocation based on current terminal fleet in the proximity of the small cell may greatly optimize macro network performance.

Examples of this small cell application of the systems and methods disclosed herein include a café or other similar location where the operator has decided to deployed a small indoor picocell. One day one or more café customers with high data traffic demand are in the café utilizing WCDMA devices, while the next day one or more customers utilizing devices equipped with LTE enter the premises. In terms of offloading the macro network, it would optimize performance for the picocell to utilize WCDMA the first day and LTE the second day.

Another example of the small cell application of the systems and methods disclosed herein include a household as a closed subscriber group (CSG) cell, to which only one or a few unique consumer ID are allowed to connect. In a case where the household is upgrading its terminal fleet, the systems and methods disclosed herein, the eSON concept, can adapt communications parameters such the RAT to match the capabilities of the new terminal fleet in the CSG.

In one embodiment, the base station 26 includes a radio resource scheduling logic (RRSL) 268 that works in conjunction with the base station controller 266 to cause the transmitter 262 to transmit the adaptation signal from the base station 26 to the terminal 24. The RRSL 268 may be part of resource scheduling software associated with the base station 26 and may be run within the network 20 as a proprietary optimization algorithm. In one embodiment, the RAT is LTE and the RRSL 268 is implemented in the eNodeB radio resource scheduling software.

The various portions of the eSON concept described in the context of the systems and methods disclosed herein may be run within the network as proprietary optimization algorithms. Changes to the pertinent standards (e.g., 3GPP TS 32.501) to specify eSON as described herein may include a new cell-specific eSON broadcast message, and would need to be captured in an updated version of the pertinent standard.

Figure 4:
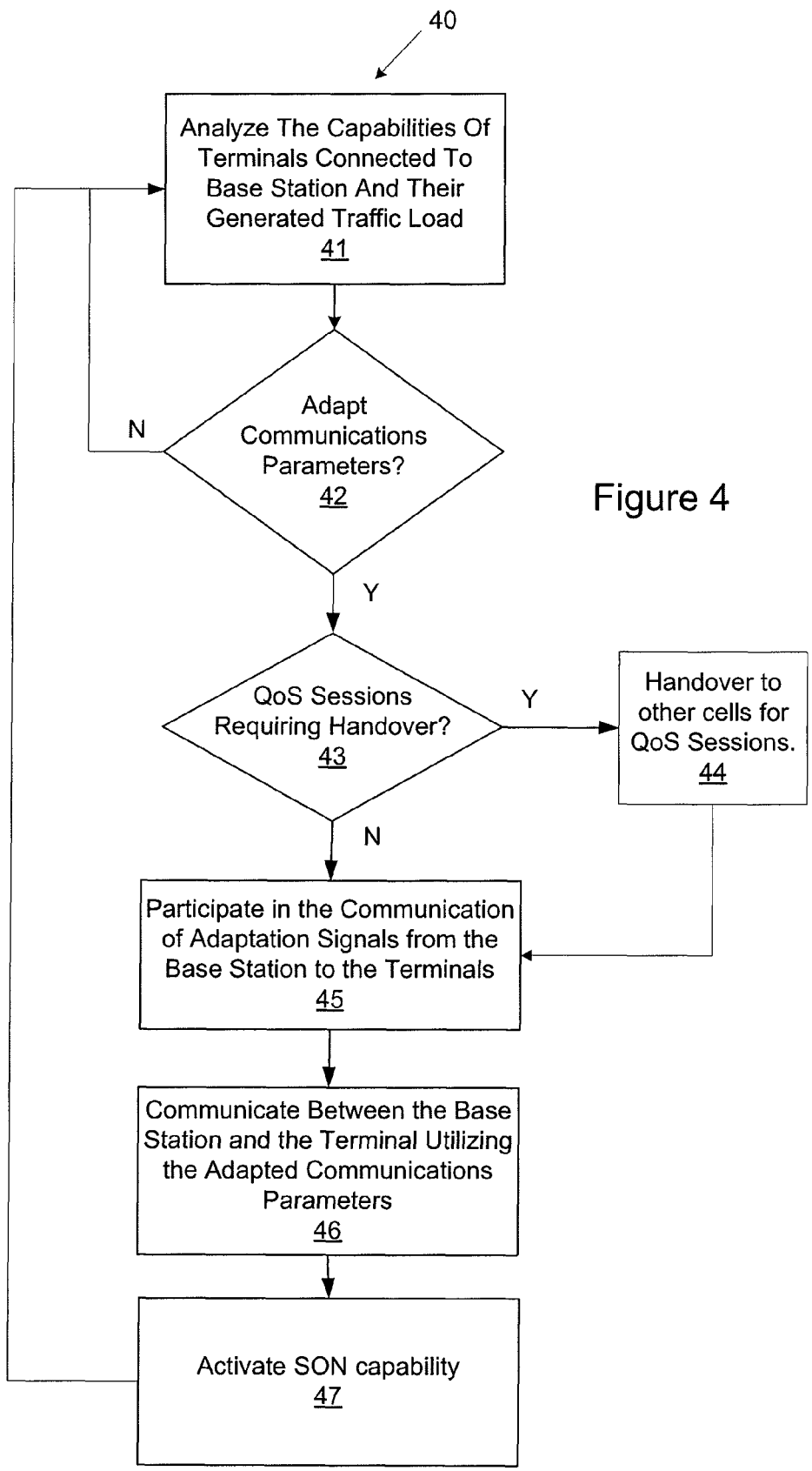
FIG. 4 shows a flowchart that illustrates logical operations to implement an exemplary method for dynamic adaptation of one or more communication parameters for communication between a base station and a terminal in a wireless telecommunications network.
Figure 5:
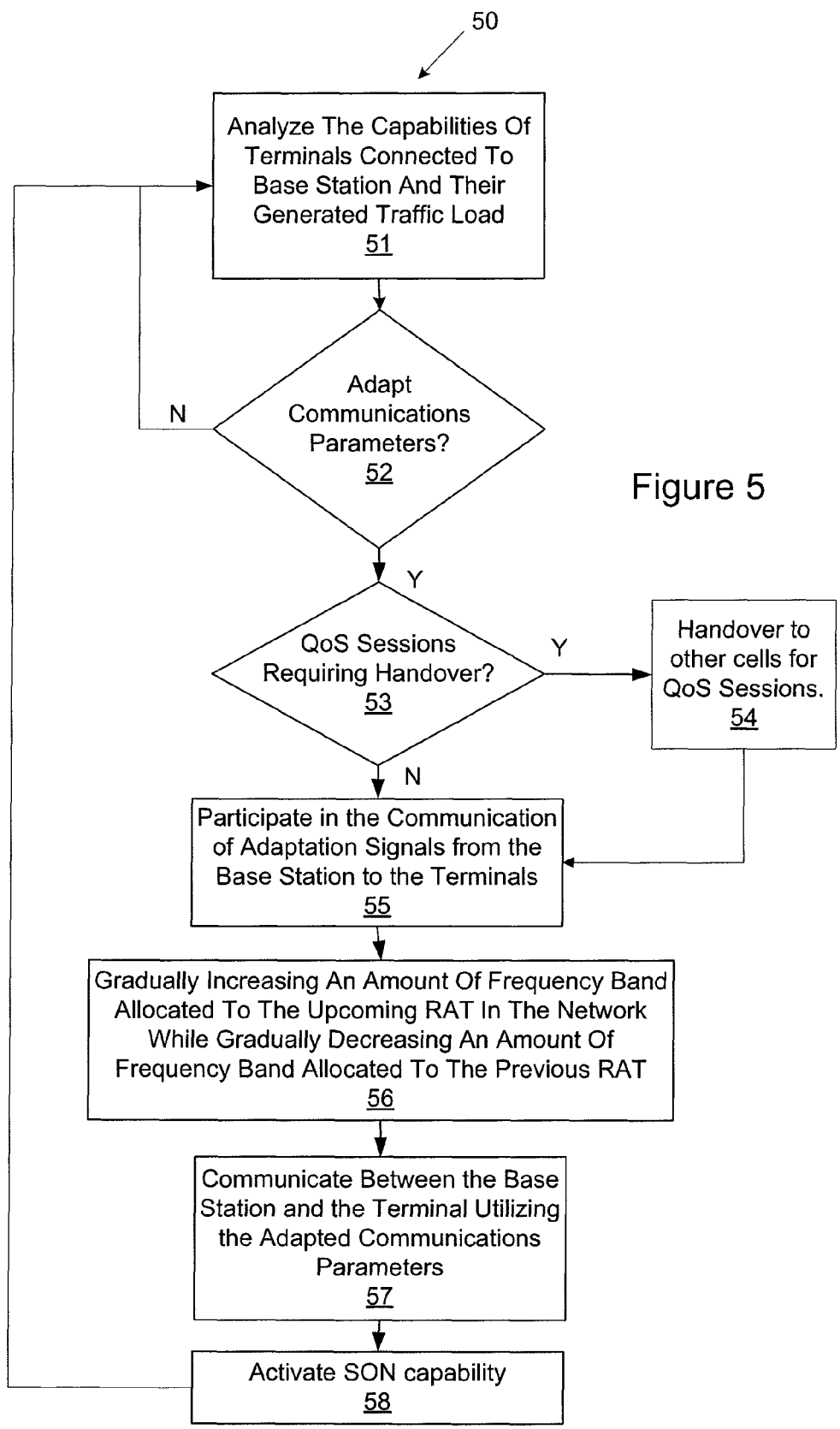
FIG. 5 shows a flowchart that illustrates logical operations to implement another exemplary method for dynamic adaptation of one or more communication parameters for communication between a base station and a terminal in a wireless telecommunications network.

In accordance with the above features, FIGS. 4 and 5 show flowcharts that illustrate logical operations to implement exemplary methods for dynamic adaptation of one or more communication parameters for communication between a base station and a terminal in a wireless telecommunications network. The exemplary methods may be carried out by executing embodiments of the base stations, terminals, mobile telephones, flash devices or machine-readable storage media disclosed herein, for example. Thus, the flowcharts of FIGS. 4 and 5 may be thought of as depicting steps of a method carried out in the above-disclosed systems or devices by operation of hardware, software, or combinations thereof. Although FIGS. 4 and 5 show a specific order of executing functional logic blocks, the order of executing the blocks may be changed relative to the order shown. Also, two or more blocks shown in succession may be executed concurrently or with partial concurrence. Certain blocks also may be omitted.

In reference to FIG. 4, logical flow of a method 40 for dynamic adaptation of one or more communication parameters for communication between a base station and a terminal in a wireless telecommunications network may begin at 41 by analyzing the capabilities of terminals connected to a base station and their generated traffic load. At 42, if, based on the analyzing the capabilities of the terminals connected to the base station and their generated traffic load, a determination is made to adapt one or more communications parameters, proceed to 43. Otherwise, return to block 41 to continue analyzing the capabilities of terminals connected to a base station and their generated traffic load. As discussed above, the communications parameters that may be adapted include the RAT or the frequency band in which the base station and the terminals connected to the base station communicate.

At 43, a determination is made regarding whether any sessions having quality of service (QoS) class are currently ongoing between the base station and the terminals. If so, at 44, the terminals in which the QoS sessions are ongoing may be handover to neighboring cells, if possible, so that the QoS sessions are not interrupted by the adaptation of the communications parameter. Back to 43, if a determination is made that no sessions having quality of service (QoS) class are currently ongoing between the base station and the terminals, or that sessions having quality of service (QoS) class are currently ongoing but that the ongoing session will not be handover, at 45 participate in the communication of an adaptation signal from the base station to the terminal using a broadcast channel between the base station and the terminal.

As discussed above, the adaptation signal includes data associated with the communication parameters to be adapted and is configured to cause the terminal to adapt one or more communication parameters and to begin network search and attach procedures for communication with the base station utilizing the adapted communication parameters. In one embodiment, the transmitting the adaptation signal from the base station to the terminal is initiated by a radio resource scheduling software associated with the base station.

At 46, the method includes, communicating between the base station and the terminal utilizing the adapted communication parameters. At 47, the method may include activating self-optimizing network (SON) capability for the base station operating utilizing the adapted communications parameter (e.g., upcoming RAT or frequency band) to cause neighboring cells in the network to recognize that the base station is operating utilizing the adapted communications parameter.

In reference to FIG. 5, logical flow of a method 50 for dynamic adaptation of one or more communication parameters for communication between a base station and a terminal in a wireless telecommunications network may begin at 51 by analyzing the capabilities of terminals connected to a base station and their generated traffic load. At 52, if, based on the analyzing the capabilities of the terminals connected to the base station and their generated traffic load, a determination is made to adapt one or more communications parameters, proceed to 53. Otherwise, return to block 51 to continue analyzing the capabilities of terminals connected to a base station and their generated traffic load. In this case, the communications parameters to be adapted include the RAT (from a previous RAT to an upcoming RAT) and the frequency band (from the previous frequency band to an upcoming frequency band) in which the base station and the terminals connected to the base station communicate.

At 53, a determination is made regarding whether any sessions having quality of service (QoS) class are currently ongoing between the base station and the terminals. If so, at 54, the terminals in which the QoS sessions are ongoing may be handover to neighboring cells, if possible, so that the QoS sessions are not interrupted by the adaptation of the communications parameters. Back to 53, if a determination is made that no sessions having quality of service (QoS) class are currently ongoing between the base station and the terminals, or that sessions having quality of service (QoS) class are currently ongoing but that the ongoing session will not be handover, at 55 participate in the communication of adaptation signals from the base station to the terminals using a broadcast channel between the base station and the terminals. The adaptation signals include data associated with the upcoming RAT and frequency band to be adapted and is configured to cause the terminal to adapt its communication parameters and to begin network search and attach procedures for communication with the base station utilizing the adapted communication parameters.

At 56, the method 50 includes gradually increasing an amount of frequency band allocated to the upcoming RAT in the network while gradually decreasing an amount of frequency band allocated to the previous RAT. At 57, the method includes, communicating between the base station and the terminal utilizing the adapted RAT and frequency band communications parameters. At 58, the method may include activating self-optimizing network (SON) capability for the base station operating utilizing the upcoming RAT and frequency band to cause neighboring cells in the network to recognize that the base station is operating utilizing the adapted communications parameters.

Figure 6:
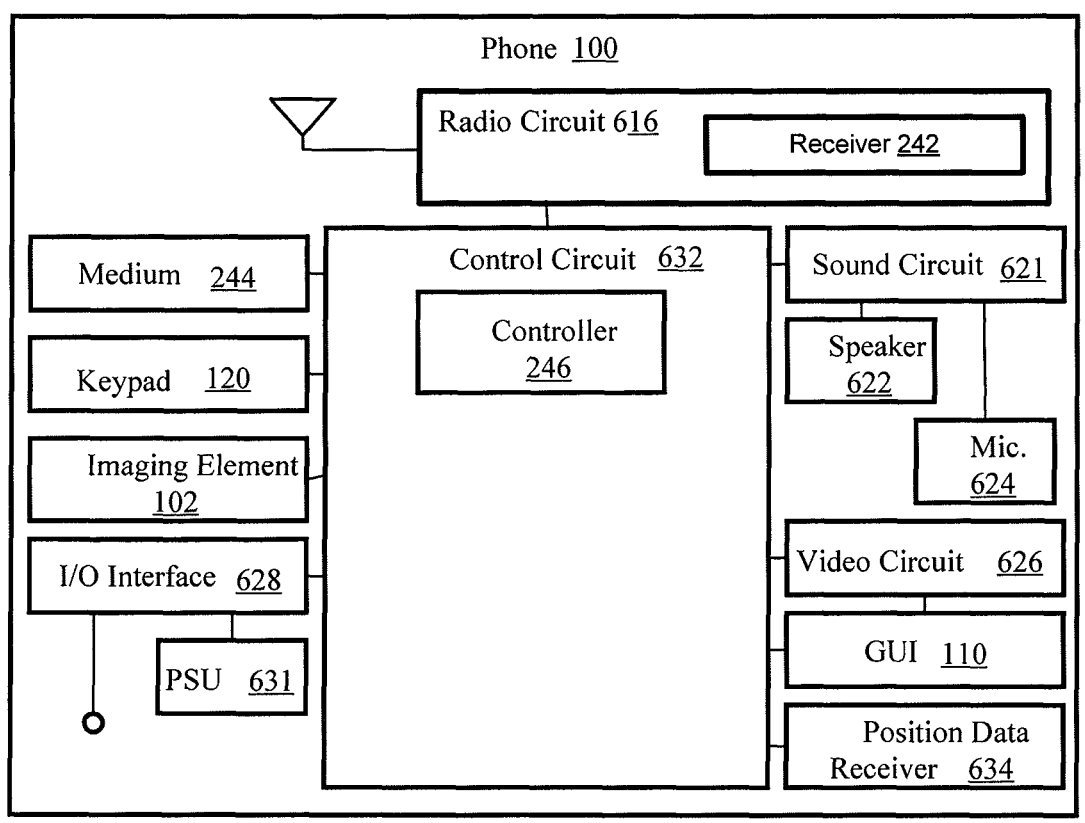
FIG. 6 illustrates a detailed block diagram of an exemplary terminal, embodied in a mobile phone 100.

FIG. 6 illustrates a detailed block diagram of an exemplary terminal, which in this embodiment is represented by the mobile phone 100. The phone 100 includes a control circuit 632 that is responsible for overall operation of the phone 100. For this purpose, the control circuit 632 includes the terminal controller 246 that executes various applications, including applications related to or that form part of the phone 100 functioning as a terminal.

In one embodiment, functionality of the phone 100 acting as a terminal as described above in reference to FIGS. 1A-5 are embodied in the form of executable logic (e.g., lines of code, software, or a program) that is stored in the non-transitory computer readable medium 244 (e.g., a memory, a hard drive, etc.) of the phone 100 and is executed by the control circuit 632. The described operations may be thought of as a method that is carried out by the phone 100. Variations to the illustrated and described techniques are possible and, therefore, the disclosed embodiments should not be considered the only manner of carrying out phone 100 functions.

The phone 100 further includes the GUI 110, which may be coupled to the control circuit 632 by a video circuit 626 that converts video data to a video signal used to drive the GUI 110. The video circuit 626 may include any appropriate buffers, decoders, video data processors and so forth.

The phone 100 further includes communications circuitry that enables the phone 100 to establish communication connections such as a telephone call. In the exemplary embodiment, the communications circuitry includes a radio circuit 616. The radio circuit 616 includes one or more radio frequency transceivers including the receiver 242 and an antenna assembly (or assemblies). Since the phone 100 is capable of communicating using more than one standard, the radio circuit 616 including the receiver 242 represents each radio transceiver and antenna needed for the various supported connection types. The radio circuit 616 including the receiver 242 further represents any radio transceivers and antennas used for local wireless communications directly with an electronic device, such as over a Bluetooth interface.

As indicated, the phone 100 includes the primary control circuit 632 that is configured to carry out overall control of the functions and operations of the phone 100. The terminal controller 246 of the control circuit 632 may be a central processing unit (CPU), microcontroller or microprocessor. The terminal controller 246 executes code stored in a memory (not shown) within the control circuit 632 and/or in a separate memory, such as the machine-readable storage medium 244, in order to carry out operation of the phone 100. The machine-readable storage medium 244 may be, for example, one or more of a buffer, a flash memory, a hard drive, a removable media, a volatile memory, a non-volatile memory, a random access memory (RAM), or other suitable device. In a typical arrangement, the machine-readable storage medium 244 includes a non-volatile memory for long term data storage and a volatile memory that functions as system memory for the control circuit 632. The machine-readable storage medium 244 may exchange data with the control circuit 632 over a data bus. Accompanying control lines and an address bus between the machine-readable storage medium 244 and the control circuit 632 also may be present. The machine-readable storage medium 244 is considered a non-transitory computer readable medium.

The phone 100 may further include a sound circuit 621 for processing audio signals. Coupled to the sound circuit 621 are a speaker 622 and a microphone 624 that enable a user to listen and speak via the phone 100, and hear sounds generated in connection with other functions of the device 100. The sound circuit 621 may include any appropriate buffers, encoders, decoders, amplifiers and so forth.

The phone 100 may further include a keypad 120 that provides for a variety of user input operations as described above in reference to FIG. 1. The phone 100 may further include one or more input/output (I/O) interface(s) 628. The I/O interface(s) 628 may be in the form of typical electronic device I/O interfaces and may include one or more electrical connectors for operatively connecting the phone 100 to another device (e.g., a computer) or an accessory (e.g., a personal handsfree (PHF) device) via a cable. Further, operating power may be received over the I/O interface(s) 628 and power to charge a battery of a power supply unit (PSU) 631 within the phone 100 may be received over the I/O interface(s) 628. The PSU 631 may supply power to operate the phone 100 in the absence of an external power source.

The phone 100 also may include various other components. For instance, the imaging element 102 may be present for taking digital pictures and/or movies. Image and/or video files corresponding to the pictures and/or movies may be stored in the machine-readable storage medium 244. As another example, a position data receiver 634, such as a global positioning system (GPS) receiver, may be present to assist in determining the location of the phone 100.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method for dynamic adaptation of one or more communication parameters for communication between a base station and a terminal in a wireless telecommunications network, the method comprising:
   participating in the communication of an adaptation signal from the base station to the terminal using a broadcast channel between the base station and the terminal,
   wherein the adaptation signal includes data associated with a first communication parameter to be adapted and that is configured to cause the terminal to adapt the first communication parameter and to begin network search and attach procedures for communication with the base station utilizing the adapted first communication parameter; and
   communicating between the base station and the terminal utilizing the adapted first communication parameter.

2. The method of claim 1, wherein
   the first communication parameter corresponds to a parameter specifying a radio access technology (RAT) for communication between the base station and the terminal, and
   the adaptation signal includes data configured to cause the terminal to adapt the first communication parameter to specify an upcoming RAT and to begin network search and attach procedures for communication with the base station utilizing the upcoming RAT.

3. The method of claim 2, comprising:
   activating self-optimizing network (SON) capability for the base station operating utilizing the upcoming RAT to cause neighboring cells in the network to recognize that the base station is operating utilizing the upcoming RAT.

4. The method of claim 2, wherein the dynamic adaptation takes place from a previous RAT to the upcoming RAT,
   the participating in the communication of the adaptation signal includes participating in the communication of one or more adaptation signals including data associated with a second communication parameter corresponding to a parameter specifying a frequency band for communication between the base station and the terminal utilizing the upcoming RAT and that is configured to cause the terminal to adapt the second communication parameter to specify an upcoming frequency band for communication with the base station in the upcoming RAT and to begin network search and attach procedures for communication with the base station utilizing the upcoming frequency band and the upcoming RAT.

5. The method of claim 4, wherein the base station is capable of communicating utilizing the previous RAT and the upcoming RAT, the method comprising:
   gradually increasing an amount of frequency band allocated to the upcoming RAT in the network; and
   gradually decreasing an amount of band allocated to the previous RAT in the network.

6. The method of claim 1, wherein
   the first communication parameter corresponds to a parameter specifying a frequency band for communication between the base station and the terminal, and
   the adaptation signal includes data configured to cause the terminal to adapt the first communication parameter to specify an upcoming frequency band and to begin network search and attach procedures for communication with the base station utilizing the upcoming frequency band.

7. The method of claim 6, comprising:
activating self-optimizing network (SON) capability for the base station operating utilizing the upcoming frequency band to cause neighboring cells in the network to recognize that the base station is operating utilizing the upcoming frequency band.

8. The method of claim 1, wherein the transmitting the adaptation signal from the base station to the terminal is initiated by a radio resource scheduling software associated with the base station.

9. A system for dynamic adaptation of one or more communication parameters for communication between a base station and a terminal in a wireless telecommunications network, the system comprising:
one or more transmitters configured for transmission of signals in the network using a broadcast channel between the base station and the terminal;
a machine-readable storage medium having stored therein data associated with a first communication parameter of the wireless telecommunications network; and
a base station controller operatively connected to the one or more transmitters and the machine-readable storage medium and configured to cause the one or more transmitters to transmit an adaptation signal from the base station to the terminal using the broadcast channel between the base station and the terminal, wherein
the data is configured to cause the terminal to adapt the first communication parameter and to begin network search and attach procedures for communication with the base station utilizing the adapted first communication parameter.

10. The system of claim 9, wherein,
the first communication parameter corresponds to a parameter specifying a radio access technology (RAT) for communication between the base station and the terminal, and
the adaptation signal includes data configured to cause the terminal to adapt the first communication parameter to specify an upcoming RAT and to begin network search and attach procedures for communication with the base station utilizing the upcoming RAT.

11. The system of claim 10, wherein the base station controller is further configured to activate self-optimizing network (SON) capability for the base station operating utilizing the upcoming RAT to perform at least one of:
causing neighboring cells in the network to recognize that the base station is operating utilizing the upcoming RAT,
setting appropriate pilot strength, and
updating a neighbor list corresponding to neighbor base stations of the base station.

12. The system of claim 10, wherein
the dynamic adaptation takes place from a previous RAT to the upcoming RAT,
the base station controller is configured to cause the one or more transmitters to transmit one or more adaptation signals including data associated with a second communication parameter corresponding to a parameter specifying a frequency band for communication between the base station and the terminal utilizing the upcoming RAT, and
the data associated with the second communication parameter is configured to cause the terminal to adapt the second communication parameter to specify an upcoming frequency band for communication with the base station in the upcoming RAT and to begin network search and attach procedures for communication with the base station utilizing the upcoming frequency band and the upcoming RAT.

13. The system of claim 12, wherein the one or more transmitters include:
a first transmitter configured to communicate in the network utilizing the previous RAT, and
a second transmitter configured to communicate in the network utilizing the upcoming RAT, and the base station controller is configured to:
gradually increase an amount of frequency band allocated to the upcoming RAT in the network; and
gradually decrease an amount of band allocated to the previous RAT in the network.

14. The system of claim 9, wherein
the first communication parameter corresponds to a parameter specifying a frequency band for communication between the base station and the terminal, and
the adaptation signal includes data configured to cause the terminal to adapt the first communication parameter to specify an upcoming frequency band and to begin network search and attach procedures for communication with the base station utilizing the upcoming frequency band.

15. The system of claim 14, wherein the base station controller is further configured to activate self-optimizing network (SON) capability for the base station operating utilizing the upcoming frequency band to cause neighboring cells in the network to recognize that the base station is operating utilizing the upcoming frequency band.

16. The system of claim 11, further comprising:
a radio resource scheduling logic configured to work in conjunction with the base station controller to cause the one or more transmitters to transmit the adaptation signal from the base station to the terminal.

17. An apparatus for dynamic adaptation of one or more communication parameters for communication between a base station and a terminal in a wireless telecommunications network, the apparatus comprising:
one or more receivers configured for receiving of signals in the network using a broadcast channel between the base station and the terminal;
a machine-readable storage medium having stored therein data associated with a first communication parameter of the wireless telecommunications network; and
a terminal controller operatively connected to the one or more receivers and the machine-readable storage medium and configured to, upon the one or more receivers receiving from the base station an adaptation signal including data configured to cause the terminal to adapt the first communication parameter, begin network search and attach procedures for communication with the base station utilizing the adapted first communication parameter.

18. The apparatus of claim 17, wherein
the first communication parameter corresponds to a parameter specifying a radio access technology (RAT) for communication between the base station and the terminal,
the adaptation signal includes data configured to cause the terminal to adapt the first communication parameter to specify an upcoming RAT, and
the terminal controller is configured to begin network search and attach procedures for communication with the base station utilizing the upcoming RAT.

19. The apparatus of claim 17, wherein
- the one or more receivers are configured to receive one or more adaptation signals including data associated with a second communication parameter corresponding to a parameter specifying a frequency band for communication between the base station and the terminal utilizing the upcoming RAT, and
- the data associated with the second communication parameter is configured to cause the terminal to adapt the second communication parameter to specify an upcoming frequency band for communication with the base station in the upcoming RAT and to begin network search and attach procedures for communication with the base station utilizing the upcoming frequency band and the upcoming RAT.

20. The apparatus of claim 17, wherein
- the first communication parameter corresponds to a parameter specifying a frequency band for communication between the base station and the terminal, and
- the adaptation signal includes data configured to cause the terminal to adapt the first communication parameter to specify an upcoming frequency band and to begin network search and attach procedures for communication with the base station utilizing the upcoming frequency band.

* * * * *